United States Patent
Wenger

(10) Patent No.: US 10,309,639 B2
(45) Date of Patent: *Jun. 4, 2019

(54) COMMUNICATION CABLES WITH ILLUMINATION

(71) Applicant: Swisscom AG, Bern (CH)

(72) Inventor: Daniel Wenger, Uttigen (CH)

(73) Assignee: SWISSCOM AG, Bern (CH)

( * ) Notice: Subject to any disclaimer, the term of this patent is extended or adjusted under 35 U.S.C. 154(b) by 0 days.

This patent is subject to a terminal disclaimer.

(21) Appl. No.: 15/822,751

(22) Filed: Nov. 27, 2017

(65) Prior Publication Data

US 2018/0224113 A1   Aug. 9, 2018

Related U.S. Application Data

(63) Continuation of application No. 15/206,952, filed on Jul. 11, 2016, now Pat. No. 9,829,193, which is a continuation of application No. 14/535,580, filed on Nov. 7, 2014, now Pat. No. 9,388,975.

(30) Foreign Application Priority Data

Nov. 7, 2013   (EP) ..................................... 13191853

(51) Int. Cl.
*F21V 33/00* (2006.01)
*H01Q 13/20* (2006.01)
(Continued)

(52) U.S. Cl.
CPC ........ *F21V 33/0052* (2013.01); *F21V 21/008* (2013.01); *G02B 6/001* (2013.01);
(Continued)

(58) Field of Classification Search
CPC ........ H01B 11/00; H01B 1/02; H01B 1/1895; G02B 6/001; F21V 33/0052; F21V 21/008; H01Q 1/06; H01Q 13/203
See application file for complete search history.

(56) References Cited

U.S. PATENT DOCUMENTS

| 4,325,039 A | 4/1982 | Allebone |
| 6,957,001 B2 | 10/2005 | He |

(Continued)

FOREIGN PATENT DOCUMENTS

| EP | 0188085 | 7/1986 |
| EP | 0643438 | 3/1995 |

(Continued)

OTHER PUBLICATIONS

European Search Report for EP13191853, dated Apr. 4, 2014. (4 pages).

*Primary Examiner* — Timothy J Thompson
*Assistant Examiner* — Amol H Patel
(74) *Attorney, Agent, or Firm* — McAndrews, Held & Malloy, Ltd.

(57) ABSTRACT

Methods and systems are provided for enhanced communication cables which may be configured for supporting at least two separate functions, including distribution of data signals and at least one other different function. An example enhanced cable may include an arrangement along at least a section of the cable, with that arrangement configured for supporting the at least one other different function. The other different function may include illumination. The cable may include or have a jacket configured to accommodate the arrangement, with the jacket being transparent or including transparent areas or openings corresponding to at least regions of the arrangement. The arrangement may include an illumination arrangement. The cable may include light guiding material configured for use in conjunction with the illumination arrangement. The cable may have leaky feeder structures, for use in support of the distribution of data signals function.

16 Claims, 2 Drawing Sheets

(51) Int. Cl.
*H01Q 1/06* (2006.01)
*H01B 11/18* (2006.01)
*H01B 1/02* (2006.01)
*F21V 8/00* (2006.01)
*F21V 21/008* (2006.01)
*F21Y 115/10* (2016.01)

(52) U.S. Cl.
CPC ........... *H01B 1/02* (2013.01); *H01B 11/1895* (2013.01); *H01Q 1/06* (2013.01); *H01Q 13/203* (2013.01); *F21Y 2115/10* (2016.08)

(56) References Cited

U.S. PATENT DOCUMENTS

| | | |
|---|---|---|
| 2004/0160774 A1 | 8/2004 | Lionetti et al. |
| 2005/0089284 A1* | 4/2005 | Ma ................. G02B 6/0008 385/101 |
| 2006/0056855 A1 | 3/2006 | Nakagawa et al. |
| 2008/0115957 A1 | 5/2008 | Duffy et al. |
| 2011/0103607 A1 | 5/2011 | Bychkov et al. |
| 2013/0026820 A1 | 1/2013 | Gocho et al. |
| 2013/0029600 A1 | 1/2013 | Mochizuki |
| 2013/0037323 A1* | 2/2013 | Smith .................. H05B 33/02 174/75 R |
| 2013/0098674 A1 | 4/2013 | Shoemaker et al. |
| 2013/0209045 A1 | 8/2013 | Dean, Jr. et al. |
| 2014/0318826 A1 | 10/2014 | Cai |

FOREIGN PATENT DOCUMENTS

| | | |
|---|---|---|
| JP | S6248139 | 3/1987 |
| JP | 2006270765 | 10/2006 |
| JP | 2013031069 | 2/2013 |
| WO | 2004073199 | 8/2004 |

* cited by examiner

COMMUNICATION CABLES WITH ILLUMINATION

CLAIM OF PRIORITY

This patent application is a continuation of U.S. patent application Ser. No. 15/206,952, filed on Jul. 11, 2016, which is a continuation of U.S. patent application Ser. No. 14/535,580, filed on Nov. 7, 2014, which in turn claims right of priority to and the filing date benefit of European (EP) Patent Application No. 13191853.4, filed on Nov. 7, 2013. Each of the above identified applications is hereby incorporated herein by reference in its entirety.

FIELD

The present disclosure relates to communications. In particular, various embodiments in accordance with the present disclosure relate to communication cables with leaky feeder structures for distribution of data signals, such as radio data signals for mobile communication, and to systems for distribution of data signals and for illumination; and methods for implementing and/or using such cables and/or systems.

BACKGROUND

Existing methods and systems for distribution of signals via communication cables can be costly, cumbersome and inefficient. For example, leaky feeders may be used in conjunction with various communication technologies and/or solutions. Typically, leaky feeders may be coaxial cables comprising an inner conductor surrounded by an insulation layer, an outer conductor arranged over the insulation shield and a jacket enclosing the outer conductor. The outer conductor may comprise a plurality of slots, gaps or other apertures along its length such that the coaxial cable emits and receives radio waves, especially very high frequency (VHF) and ultra high frequency (UHF) waves, or waves of mobile telecommunication systems, such as like wireless local area network (WLAN), Universal Mobile Telecommunications System (UMTS) or Long-Term Evolution (LTE), along its length, Leaky feeders may be used as radiating cables or antennas in a variety of applications, for example for underground communication, in aircraft systems, for in-building communication, in mobile communication and many others. In a previous use scenario, leaky feeders were used as distributed aperture antennas for a multi-user wireless communication system. The apertures of the leaky feeders may allow radiated energy to leak from the antenna and form low-power, localized electric fields that can couple receivers to the antenna. The multiple electric fields may ensure that the electric field strength is distributed throughout the communication system.

The leaky feeders may be installed together with other wiring bundles in existing harness channels or just within the ceiling or the floor of a room or vehicle. Attention has to be paid that the signal of the leaky feeder is not shielded by structures, which would influence the communication system. Thus the leaky feeders often are installed in exposed, visible areas, which interfere with styling and optical design of the room or vehicle. In another use scenario, a communication system uses a leaky optical fiber for optical communication. The system worked as a light communication device, Instead of radio signals, data is transmitted by light of a light emitting unit (e.g., laser diodes or light emitting diodes). The light is modulated by a signal controller in accordance with data to be transmitted. The light signal data then is transferred by a leaky optical fiber. Light receiving units receive and demodulate the light and transmit the resulting data to a network. The light of the light emitting unit is only used for modulating the data to be transferred.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

A system and/or method is provided for communication cables with illumination, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

BRIEF DESCRIPTION OF THE DRAWINGS

Various features and advantages of the disclosure will become apparent from the following description of non-limiting exemplary embodiments, with reference to the appended drawings, in which.

DETAILED DESCRIPTION OF THE DISCLOSURE

Figure 1:
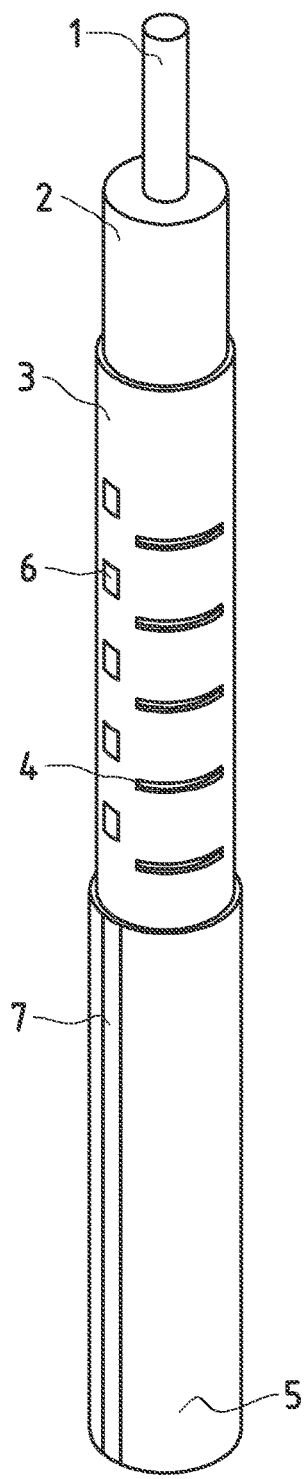
FIG. 1 illustrates a communication cable configured according to a first example embodiment.

As utilized herein the terms "circuits" and "circuitry" refer to physical electronic components ("hardware") and any software and/or firmware ("code") which may configure the hardware, be executed by the hardware, and or otherwise be associated with the hardware. As used herein, for example, a particular processor and memory may comprise a first "circuit" when executing a first plurality of lines of code and may comprise a second "circuit" when executing a second plurality of lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y and/or z" means "one or more of x, y and z." As utilized herein, the terms "block" and "module" refer to functions than can be performed by one or more circuits. As utilized herein, the term "example" means serving as a non-limiting example, instance, or illustration. As utilized herein, the terms "for example" and "e.g.," introduce a list of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Certain embodiments in accordance with the present disclosure may be found in methods and/or systems for communication cables with illumination, as described in the following in more detail with reference to the attached figures.

In various embodiments in accordance with the present disclosure, a communication cable may be provided which may serve multiple purposes, reduce the overall installation effort and costs, and save installation space, while also comprising a simple structure.

In an example embodiment, a communication cable for distribution of data signals, in particular for homogeneous distribution of radio data signals, may comprise a core conductor, an insulation shield, an outer conductor with a plurality of apertures basically along its full length, and a jacket. The communication cable may be designed as a leaky feeder structure, wherein the apertures of the outer conductor may serve for the distribution of the data signals. An illumination arrangement may be arranged at least along sections of a length of the cable, for example along the bigger part or even the full length of the cable. Accordingly, apart from the basic function of distributing data signals, the communication cable may also perform or support other functions—e.g., as a design element, an aid for marking foot paths, emergency exits or the like, for the lighting of rooms, tunnels, aircrafts, etc., for the surveillance of the communication cable and for other applications. Further, the communication cable may save installation space, because only one installation for both functions is required, and may reduce weight of the wiring necessary to fulfill all these functions.

In an example embodiment, the outer conductor of the communication cable may comprise additional layers according to specific requirements of the cable. For example, there may be additional layers for isolation, for visual protection of the outer conductor, and/or for material separation. These layers may be designed such that radio waves at least partly can transmit through the layers to provide a radiating cable.

In an example embodiment, the communication cable may be used for distributing radio data signals—e.g., for communication by GSM, 3GPP, PCS, LTE, UMTS, WLAN, CDMA95, CDMA2000 or other wireless communication systems. In this regard, the communication cable may comprise metal conductors as the core conductor and the outer conductor as used in coaxial cables for radio data transmission and reception, in particular copper conductors. The illumination arrangement may also be incorporated in other coaxial cables comprising a leaky feeder structure.

The illumination arrangement arranged at least along sections of the length of the communication cable may comprise various different layouts. The illumination arrangement may comprise one or more light units configured for emitting light. Examples of light units may comprise light emitting diodes (LEDs), illuminated fiber tubes or fiber strips, plastic/polymeric optical fibers (POF), fluorescence units, lasers and/or bulbs, or a combination thereof. In some instances, the light units themselves may be set up by several light emitting elements. In some instances, the light units may comprise different colors. Also they may have different sizes as long as they cooperate with the size of the leaky feeder structure.

In an example embodiment, a fluorescence unit may be realized by a dielectric area in a way that such area is not filled by a hard material but by distance-holders defining a free space in between each other, which can be filled with gas for fluorescence purposes. A transparent jacket element may be provided just inside the outer conductor or outside the outer conductor which prevents the gas from diffusion. Furthermore the distance holders may be used as a cathode and/or an anode of the cable.

In an example embodiment, the illumination arrangement may be located on an outer surface of the jacket. For example, a plurality of light units may be attached on the jacket, such as by an adhesive bonding (e.g., glue), to achieve that. Attention may be paid not to cover the apertures of the outer conductor with the light units, however. Further, the light units may be LED units, fluorescent elements or other light emitting elements. In addition to the first jacket covering the outer conductor, a second jacket may be provided for covering the illumination arrangement arranged on the outer surface of the first jacket.

In an example embodiment, the illumination arrangement of the communication cable may be powered by an electrical power supply independent of the power supply of the leaky feeder structure. Alternatively, the power supply of the leaky feeder structure may be used to energize the illumination arrangement.

In an example embodiment, the illumination arrangement of the communication cable may be arranged radially inside the jacket, and the jacket may be transparent or comprise openings at least in regions of the illumination arrangement. For example, the illumination arrangement may be arranged between the jacket and the outer conductor along the length of the communication cable. The light units of the illumination arrangement may also be located within the apertures of the outer conductor without fully covering the apertures or the light units may be located in separate holes in the outer conductor. Further, the light units of the illumination arrangement may be arranged on or in an outer surface of the insulation shield, for example next to or between apertures in the outer conductor. Accordingly, in such embodiment the illumination arrangement may comprise a plurality of light units arranged between the jacket and the insulation shield along the outer conductor and the jacket may be transparent at least in regions of the light units. The outer conductor may be part of the power supply of the light units arranged between the jacket and the insulation shield along the outer conductor, and in which case no separate power supply for the illumination arrangement is necessary. Thus, the outer conductor contributes to power the light units of the illumination arrangement.

In an example embodiment, the apertures and the illumination arrangement of the communication cable may be arranged such that radiation and illumination may be emitted in the same spatial direction. This may be desirable in such instances, for example, where the communication cable is mounted on the ground, the wall and/or the ceiling, so that radiation may be directed to an open space of the surroundings instead towards the ground, wall and/or ceiling for example.

In an example embodiment, the illumination arrangement may comprise a plurality of light units arranged radially inside the insulation shield along the core conductor. Further, the insulation shield and the jacket may be transparent at least in regions of the apertures of the outer conductor and/or in regions of other holes in the outer conductor. The core conductor may be part of the power supply of the light units arranged radially inside the insulation shield. Thus, the core conductor may contribute to power the light units of the illumination arrangement.

In an example embodiment, a communication cable powering the illumination arrangement may comprise two or more conductors. For example, the combination of the leaky feeder structure and the illumination arrangement may be implemented or configured such that none, one, or both of the core conductor and outer conductor of the leaky feeder structure may be used to supply power to the illumination arrangement. In instances where the illumination arrangement is powered by the conductors of the leaky feeder structure there may be less installation effort and less space may be required within the communication cable.

It some instances, various aspects of the example embodiments may be combined. For example, in some implementations there may be light units on the inside of the jacket and on the inside of the insulation shield. The jacket and/or the insulation shield may have, for example, slight indentations on their inner or outer surfaces to accommodate the light units. Also, a second shielding or sleeve between the outer conductor and the jacket can be used for accommodation of the illumination arrangement, which may be interrupted in areas of the apertures of the outer conductor to allow for proper distribution of the data signals. The sleeve also may be designed as a light guide and serve as an illumination arrangement. Also, the insulation shield may be fabricated of light guiding material. Light emitted by a light unit may illuminate the insulation shield and may exit the communication cable via the apertures of the outer conductor and transparent areas in the jacket.

It an example embodiment, the apertures, holes and/or openings in the outer conductor, the jacket and the insulation shield may be designed to generate a specific illumination pattern. For example, the illumination pattern may include periodically changing colors or changing colors from one end to another end of a section of the communication cable or along the full length of the cable. The light units may also be arranged in figurative pattern—e.g., in a spiral pattern or arrow pattern around the communication cable or the like.

It some instances, the illumination arrangement may be used to find or survey the apertures in the outer conductor and help to survey and inspect the leaky feeder structure.

In an example embodiment, a system for distribution of data signals and simultaneously for illumination according to the present disclosure may use a communication cable designed and/or configured in accordance with the present disclosure—e.g., in accordance with one or more of the example embodiments described above. With such system the communication cable can be installed easily, and with less interference with the style of the environment. Further, the system can provide a helpful use for orientation and attention.

FIGS. 1 to 4 depict communication cables implemented and/or configured in accordance with various, alternate, example embodiments in accordance with the present disclosure. Further, while not shown in FIGS. 1 to 4, a system may comprise each of the communication cables shown in these figures, and may (the system) comprise suitable circuitry for implementing various aspects of the present disclosure.

Each of the communication cables shown in FIGS. 1 to 4 may comprise a cable with a leaky feeder structure. An example leaky feeder structure in accordance with the present disclosure may comprise, for example, a core conductor 1, an insulation shield 2, an outer conductor 3, one or more apertures 4 (or 4'), and a jacket 5. Further, each of the communication cables shown in FIGS. 1 to 4 may comprise one or more light units (e.g., LEDs 6, 6' and/or a plastic optical fiber 8), for use as an illumination arrangement along the length of the communication cable.

The core conductor 1 may be suitable (e.g., comprising suitable material and/or components, and/or be implemented in accordance with a particular suitable design) to carry signals (e.g., a radio signal), which may be intended, for example, for wireless emission via the communication cables. The insulation shield 2 may be suitable (e.g., comprising suitable material and/or components, and/or be implemented in accordance with a particular suitable design) for insulation. For example, the insulation shield 2 may comprise a dielectric material and may, among other things, be used to provide a desirable geometric arrangement of the elements and components of the communication cables while being enabled to be polarized by an electric field so that radio waves such as those carried by the core conductor 1 may be radiated through it. The outer conductor 3 may be suitable (e.g., comprising suitable material and/or components, and/or be implemented in accordance with a particular suitable design) for functioning as further shielding and help to isolate the core conductor 1. The jacket 5 may be suitable (e.g., comprising suitable material and/or components, and/or be implemented in accordance with a particular suitable design) for at least partly covering the outer conductor 3. The LEDs 6 or the plastic optical fiber 8 may comprise suitable circuitry for generating illumination—e.g., radiation in the visible spectrum.

An example communication cable with a leaky feeder structure may comprise a core conductor 1, an insulation shield 2 surrounding the core conductor 1, an outer conductor 3 around the insulation shield 2 with one or more apertures 4 along its length and the jacket 5 covering the outer conductor 4. The core conductor 1 and the outer conductor 3 may be made of copper, for example. Alternatively, copper alloys, silver or aluminum may be used. The insulation shield may be made of dielectric material, and may comprise an indentation formation on its inner or outer surface to accommodate the illumination arrangement. The insulation shield 2 may comprise a cylindrical shape, but also may have another shape—e.g., a triangular, a square or other non-cylindrical shape, which may still ensure the function of the leaky feeder structure and additionally may represent a design element of the illuminating function of the communication cable, for example to create differing light patterns.

In accordance with some example embodiments, the jacket 5 may comprise small indentations (not visible), which may accommodate the light units (e.g., the LEDs 6). For example, the jacket 5 may comprise, for example, a transparent material, at least in the area of the indentations. The transparent material may be arranged, for example, as a longitudinal transparent stripe 7 along the length of the line of light units, as illustrated in the example embodiment depicted in FIG. 1. The transparent material area also may include the indentations to accommodate the LEDs 6. The outer conductor 3 may power the LEDs 6, in some cases.

FIG. 1 illustrates a communication cable configured according to a first example embodiment. In this regard, the communication cable shown in FIG. 1 may comprise an example illumination arrangement with light units in the form of LEDs 6 positioned on the outer surface of the outer conductor 3. The LEDs 6 may be, for example, arranged longitudinally along the length of the cable. The LEDs 6 in the communication cable shown in FIG. 1 may be spaced equidistantly. Nonetheless, the disclosure is not so limited, and other implementations any spacing between the LEDs 6 may be used. The LEDs 6 may be arranged such that their interference with the functioning of the apertures 4 may be reduced significantly. For example, the line of LEDs 6 may be located on a section of the circumference of the outer conductor 3 which may not comprise any apertures in the longitudinal direction, while a line of apertures 4 may run longitudinally along the cable in another section of the circumference of the outer conductor 3.

Figure 2:
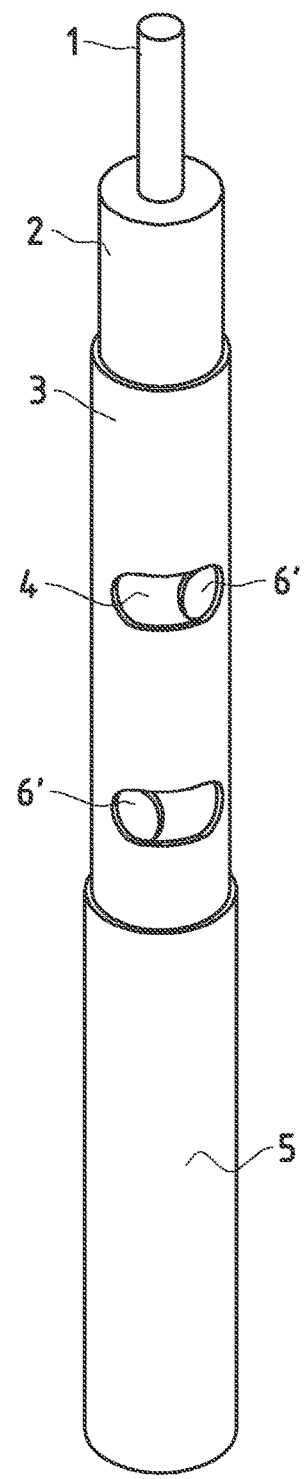
FIG. 2 illustrates a communication cable configured according to a second example embodiment.

FIG. 2 illustrates a communication cable configured according to a second example embodiment. In this regard, the communication cable shown in FIG. 2 may comprise an illumination arrangement with light units in form of round (or any arbitrary shape) LEDs 6' positioned in a corner of the apertures 4 of the outer conductor 3. The remaining opening of the apertures 4 may be designed and/or sized to ensure appropriate functioning of the leaky feeder structure of the communication cable. The jacket 5 may be transparent. The LEDs 6' may be powered by the outer conductor 3. In some implementations, the LEDs 6' may be configured to emit light of different colors. Further, in some implementations, the LEDs 6' may be alternately positioned in another corner of the apertures 4, or also elsewhere in the apertures 4. Thus, the placement of the LEDs 6' maybe arranged to form desirable light patterns for the communication cable of the embodiment shown in FIG. 2.

Figure 3:
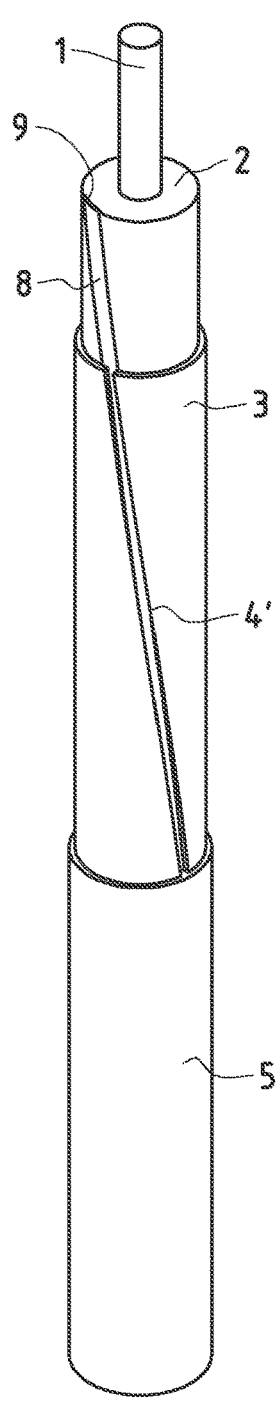
FIG. 3 illustrates a communication cable configured according to a third example embodiment.

FIG. 3 illustrates a communication cable configured according to a third example embodiment. In this regard, the communication cable shown in FIG. 3 may comprise an illumination arrangement with a light unit in form of a plastic optical fiber (POF) 8. The plastic optical fiber 8 may be designed and/or implemented as an inlay in a recess 9 in the insulation shield 2 running along the length of the communication cable. The outer conductor 3 may comprise an aperture 4' in the form of a slit along the length of the outer conductor 3. For example, the aperture 4' may be arranged opposite to (or over) the recess 9 in the insulation shield 2, and covering the plastic optical fiber 8. The aperture 4' may be a spiral slit as illustrated, or a straight slit, or any other desirable shape. The jacket 5 may be transparent, such as along its length for example. The plastic optical fiber 8 may be flexible so that the communication cable remains flexible and can easily be installed around corners or the like. Nonetheless, the disclosure is not so limited, and other patterns than a spiral shape may also be used for the plastic optical fiber 8.

Figure 4:
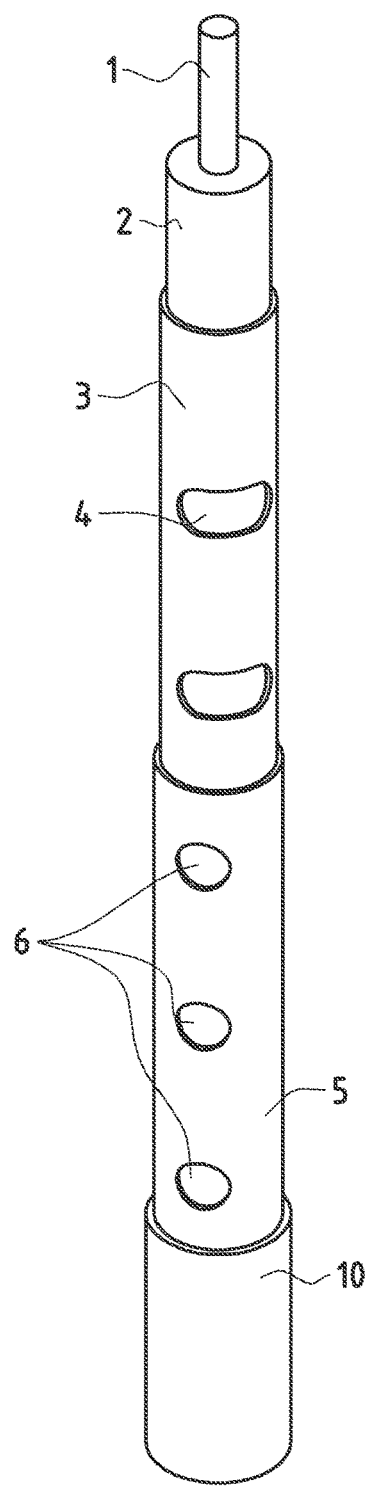
FIG. 4 illustrates a communication cable configured according to a fourth example embodiment.

FIG. 4 illustrates a communication cable configured according to a fourth example embodiment. In this regard, the communication cable shown in FIG. 4 may comprise a leaky feeder structure with inner core conductor 1, dielectric insulation shield 2, an outer conductor 3 with apertures 4 and a jacket 5. Further, the communication cable shown in FIG. 4 may comprise illumination arrangement represented, for example, by LEDs 6, with the powering of the illumination arrangement being added on top of the jacket 5 and protected by a second jacket 10, which may be completely or partially transparent. The jacket 5 (the first jacket) may be, for example, black to provide some reflection of the light emitted by the LEDs 6. Accordingly, independent production of communication and illumination part may be allowed, because the light units of the illumination arrangement are located on the outer surface of the first jacket 5 of the communication cable. The second jacket 10 may be used to protect and fix the illumination arrangement to the outer surface of the first jacket 5.

In various example use scenarios, a communication cable according to the present disclosure (e.g., any of the communication cables shown in FIGS. 1 to 4) may be used in order to detect cable damage. For example, damage may be detected at a location along the cable where the illumination does not work anymore. Such event or condition (illumination not working at particular point) may give an indication that the illumination arrangement and/or the supply conductors are damaged, thereby providing a visible clue to find the damage location on the communication cable.

The radio emission function of communication cable according to the present disclosure (e.g., any of the communication cables shown in FIGS. 1 to 4) may follow the technical concept of leaky feeders.

In various example use scenarios, a communication cable according to the present disclosure (e.g., any of the communication cables shown in FIGS. 1 to 4) may be part of a system for the distribution of data signals and for illumination used in exposed or visible installations of the cable, in particular within closed environments. In some instances, different layouts of an illumination arrangement comprising different light units, different patterns of light units or different positions of light units (e.g., as described with respect to each of the communication cables shown in FIGS. 1 to 4) may be combined within one single communication cable. Doing so may be desirable as it may offer a system for communication and illumination of a large variety of light patterns along the cable. Further, a system for the distribution of data signals and for illumination may include a plurality of separately installed communication cables and/or the plurality of communication cables may comprise communication cables of varying designs (corresponding to a plurality of the example communication cables shown in FIGS. 1 to 4). In other words, in a particular example system, several communication cables with differing designs may be combined.

While the present disclosure makes reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed:

1. A system comprising:
    a cable configured for supporting at least two separate functions, said two separate functions comprising distribution of data signals and at least one other different function; and
    wherein:
        said cable comprises an arrangement along at least a section of said cable, said arrangement configured for supporting said at least one other different function; and
        said cable comprises a leaky feeder structure, for use in supporting said distribution of data signals.

2. The system of claim 1, wherein said at least one other different function comprises illumination.

3. The system of claim 1, wherein said cable comprises one or more conductors, and at least one conductor provides power to said arrangement.

4. The system of claim 3, wherein said one or more conductors comprise metal conductors.

5. The system of claim 1, wherein said cable comprises a jacket configured to accommodate said arrangement.

6. The system of claim 5, wherein said jacket is transparent or comprises one or more transparent areas or openings at least in regions of said arrangement.

7. The system of claim 1, wherein said arrangement comprises an illumination arrangement.

8. The system of claim 7, wherein said illumination arrangement comprises one or more of: emitting diodes, illuminated fiber tubes, illuminated fiber strips, plastic optical fibers, fluorescence units, lasers, and bulbs.

9. The system of claim 7, wherein said cable comprises light guiding material configured for use in conjunction with said illumination arrangement.

10. The system of claim 7, wherein said illumination arrangement comprises one or more light units.

11. The system of claim 10, wherein:
said one or more light units are arranged along an internal component of said cable; and
said cable comprises one or more external components, to the outside of said internal component, wherein said one or more external components are transparent at least in regions corresponding to said one or more light units.

12. The system of claim 11, wherein said internal component powers said one or more light units.

13. The system of claim 11, wherein:
said internal component comprises a conductor;
said one or more external components comprise a jacket and an insulation shield; and
said one or more light units are arranged between said jacket and said insulation shield along said conductor.

14. The system of claim 1, wherein said cable comprises a plurality of apertures arranged on at least one component of said cable in accordance with a specific pattern based on said arrangement.

15. The system of claim 1, wherein said arrangement is arranged radially.

16. The system of claim 1, comprising one or more circuits configured for supporting said distribution of data signals and/or said at least one other different function.

* * * * *